Patented June 24, 1941

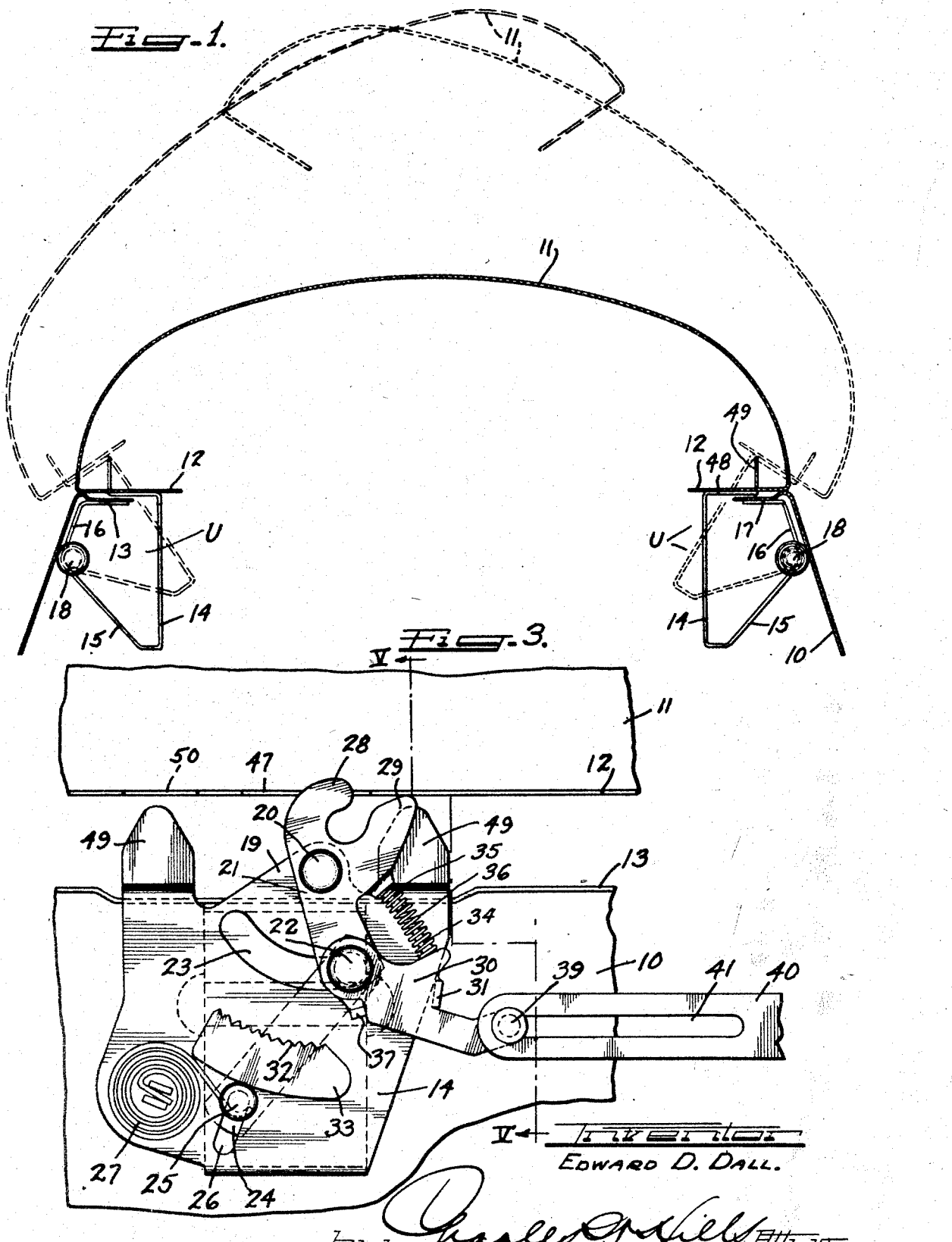

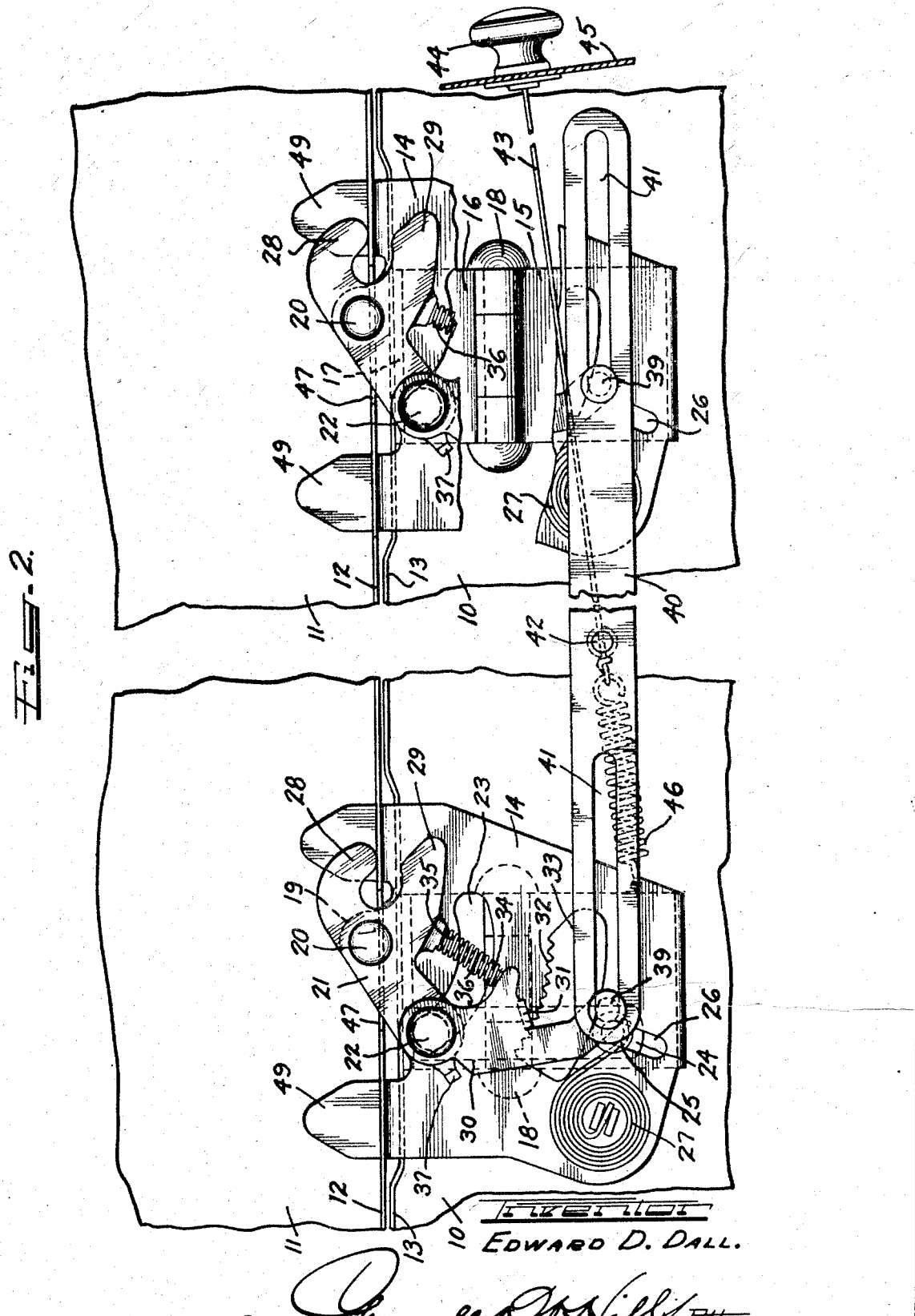

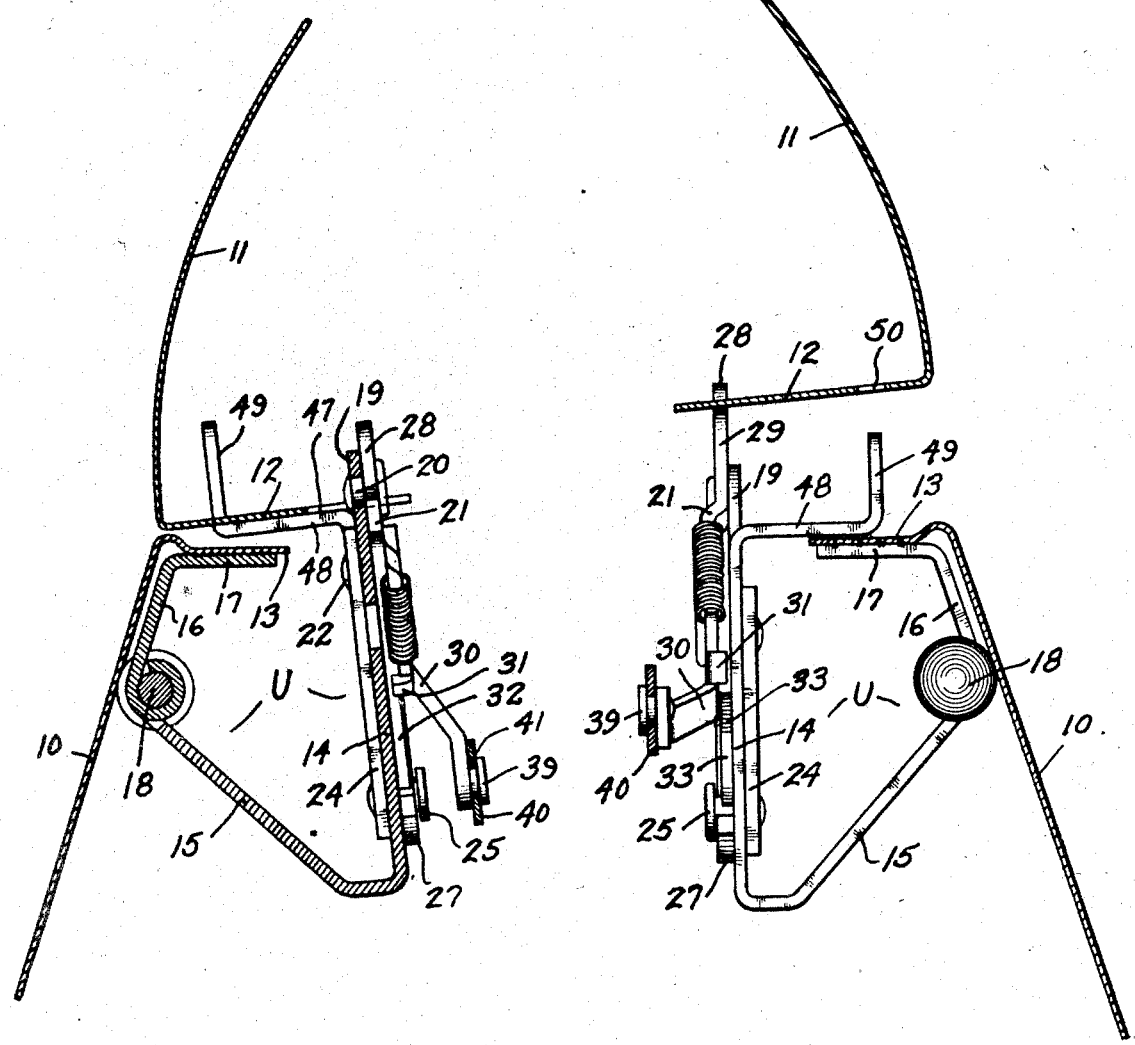

2,246,792

UNITED STATES PATENT OFFICE 2,246,792

COMBINATION HINGING AND LATCHING ASSEMBLY FOR AUTOMOBILE HOODS

Edward D. Dall, Detroit, Mich., assignor to Houdaille-Hershey Corporation, Detroit, Mich., a corporation of Michigan Application October 19, 1940, Serial No. 361,843

3 Claims. (Cl. 16—128.1)

My invention relates to a combination hinging and latching assembly for enclosures having a single closure member adapted for hinging engagement at its opposite sides with the enclosure body so that it may be swung open from either side of the body. My invention has particular utility on automobile hoods in which the single hood cover or top is to be swung to open position from either side of the hood body.

An important object of the invention is to provide latching units within the hood body at each side thereof and operable to latch the cover in closed position, and with each latch unit formed to function as a hinge when in latching engagement with the cover, so that when the cover is unlatched at one side the latching units at the other side will function as hinges for swinging of the cover along such hinge line to open position.

A further important object of the invention is to provide actuating means for the latch units at each side of the hood operable from within the vehicle body, so that the hood cover may be unlatched for opening swing in either direction, or may be entirely unlatched for bodily removal from the hood body.

Still another important object is to provide latch mechanism which, when set to unlatching position, will effect a partial opening swing of the cover a sufficient distance so that the fingers may be inserted for swinging the cover to its full open position.

Another object is to adapt the combined latch and hinge unit for quick or snap movement to unlatching condition by means of a cross center spring arrangement which will also function to exert latching pressure to hold the cover securely closed and against rattling or displacement when in its closed position.

The various features of my invention are incorporated in the structure disclosed on the drawings, in which drawings:

Figure 1 is a transverse section of an enclosure such as an automobile hood, the combination hinge and latching units being shown more or less diagrammatically, and the hinging movements of the cover being shown in dotted lines;

Figure 2 is an enlarged inside elevation of the hinging and latching units at one side of the enclosure body;

Figure 3 is an elevation of one of the units showing it in unlatched position and with the cover partially open;

Figure 4 is an end elevation, with the supporting frame in vertical section, of one of the units at the left side of the enclosure body shown on Figure 1, and showing the latch mechanism in latching position so that the unit may act as a hinge; and Figure 5 is a section on plane V—V of Figure 3 showing one of the latching units at the right side of the hood body in unlatching condition for release of the cover for opening swing.

Referring to Figure 1, 10 indicates the hood body and 11 indicates the unitary cover or top. The cover has the inwardly extending flanges 12 at its sides which, when the cover is closed, seat against the upper edge of the body 10 and on inwardly extending seating or sill flanges 13. At each side of the body 10, below the sill flange 13, a number of combination hinge and latch units U are secured, the units at each side of the hood being simultaneously actuatable to unlatching condition by a control within the vehicle body.

The units are of identical construction, except that the latching elements are arranged thereon for application of the units on the left side and the right side of the hood body. Each unit comprises a supporting wall or base 14 for the latching controlling elements. A diagonal extension 15 from the lower end of the wall 14 forms one element of a hinge, whose other element 16 extends upwardly along the inside of the hood body 10 and has its upper portion 17 deflected laterally inwardly to be secured, as by welding, against the under side of the seating sill 13. The hinge members 15 and 16 are connected together by a hinge pin 18.

The arrangement of the latching elements on the inside of the plate 14 is substantially like the arrangement of the latch structure disclosed in my copending application Serial No. 336,696, filed May 23, 1940. The upper extension 19 on the plate 14 carries a fulcrum pin 20 for the latch bolt or lever 21 which, at its lower end, has a pin 22 extending therefrom for travel in the arcuate slot 23 in the plate. This pin 22 receives the upper end of a bar 24 which at its lower end has a guide stud 25 extending therefrom through the guide slot 26 in the plate, a spring 27 exerting upward pressure against the bar.

The latch bolt 21 at its upper end terminates in the latching arm 28 below which the setting arm 29 extends from the bolt. Depending from the pin 22 on the bolt 21 is the detent or pawl member 30 which intermediate its ends is deflected to provide a pawl or detent tooth 31 for engagement with detent teeth 32 provided on a bar member 33 which may be deflected from the plate 14 or may be a separate bar secured to the plate. Extending from the detent pawl is a post 34, and extending from the arm 29 on the latch lever is a post 35, these posts receiving a compression spring 36, which tends to swing the latch bolt and pawl apart, and which, when the pawl is released from the tooth bar 33, will be held by the spring against a stop 37 on the bolt. When the latch bolt is in its latching position as shown on Figure 2, the pawl tooth will be in engagement with one of the teeth 32 on the rack bar 33, and the bolt will be locked against unlatching movement. When pull is exerted on the lower end of the pawl, the pawl tooth will first be disengaged from the rack teeth for release of the latch bolt and then upon further swing of the pawl and pull thereon the post 34 will engage the post 35 on the bolt, and the bolt will be rocked toward its unlatching position, and as soon as the pin 22 moves past the center line of pressure of the spring 27 extending between the fulcrum pin 20 and the stud 25 engaged by the spring, the latch bolt will be quickly snapped by the spring pressure into its unlatching position. Conversely, when the latch bolt is moved toward latching position from unlatching position and the pin passes the spring center line of pressure, the bolt will be quickly snapped back to its latching position.

On each latching unit the detent pawl at its lower end has a stud 39, and the studs of the latching units at one side of the hood body are connected by a bar 40, the studs extending through elongated longitudinal slots 41 in the bar. The bar carries a stud 42 to which a rod or wire 43 is connected, this rod or wire extending into the housing or compartment of the vehicle and there secured to a knob or button 44 which may be located on the instrument panel 45. When this knob is pulled, the bar 40 will be shifted and the latch bolts of the units on that side of the hood will be simultaneously rocked toward their unlatching position, the springs 27 quickly completing such movement. As shown on Figure 2, the wire or rod 43 is slidable in the stud 42 on the bar 40 and the inner end of the rod is connected by a spring 46 with the plate 14 of one of the units so that, when the bar has been pulled out by the button 44 for setting of the latch bolts to unlatching position, and the button is then released, the spring will shift the button back to its normal position. As will be explained later, when the hood cover is closed, it will engage with the latch bolts to swing them back to their latching position, and then the bar 40 will be returned from the position shown on Figure 3 to its normal position shown on Figure 2.

In each latching unit, the flange 12 of the cover has an opening or passageway 47 through which the latching end of the latch bolt extends when the cover is closed. When the cover is closed and the latch bolts are in latching position, the latching arms 28 of the bolts will engage against the inner side of the flange 12, and the pressure of the springs 27 will hold these latch bolts with such spring pressure engagement against the flange. The base plate 14 of each latching unit has horizontally outwardly extending arms 48 terminating in vertically extending guide ends 49, which ends are tapered as shown on Figure 2. The horizontal arms 48 are engageable with the sill flanges 13 on the hood body for holding the unit in its normal position, and the guide ends 49 normally extend through slots 50 in the cover flange 12 to hold the cover, when closed, in alignment on the hood and to assist in securing the unit to the cover for hinge operation thereof, as shown on Figure 4.

The full lines on Figure 1 show the cover in closed position and held in such position by the latch units. If it is desired to swing the cover open from the right side of the hood, the button 44 for the latching units at the right side of the hood is pulled for rocking of the bolts at that side of the hood to unlatching position, and when the bolts are thus rocked, their setting arms 29 will engage with the under side of the cover flange 12 to swing the cover partially open, as shown on Figure 5, so that the fingers may be inserted for swinging the cover fully open. During such swing of the cover, the latching units at the left side of the hood will remain in their latching position, the latch bolts holding the flange 12 against the arms 48 of the units, and the ends 49 on the arms holding the flange against lateral displacement on the arms. The hinge elements 15, which support the latching mechanism will swing with the hood on the hinge pins 18, as indicated on Figure 4 and as indicated by the dash lines on Figure 1. Suitable prop structure, not shown, may be provided for holding the cover in its open position, in any manner well known in the art.

When the cover is to be closed, the prop is released and the cover swung down toward its closing position, the latter part of said closing movement being guided by the guide ends 29 at the right side of the hood entering the guide slot 50 in the cover flange. Also during such closing movement, the flange 12 will engage with the setting arms 29 of the units, as shown on Figure 3, and the latch bolts will be swung down toward latching position, the final movement of which is rapidly accomplished by the pressure of the springs 27, the cover being then latched in its closed position. The slots 23 in the plate 14 preferably extend sufficiently toward the left (Figure 2) so that when the latch bolts are rocked to latching position, the pins 22 will not abut the slot ends in order that the pressure of the springs 27 may be maintained against the latch bolts for pressure engagement of the latching arms 28 of the bolts with the flange 12 of the cover to hold the cover pressed shut and against rattling.

If it is desired to swing the cover open from the left side of the hood, the corresponding button within the vehicle is pulled for unlatching of the units at the left side, and the units on the right side will function as hinges. If it is desired to bodily remove the cover from the hood, the left and right side buttons are pulled for releasing of all of the latch bolts. For unlatching, it is necessary to pull the buttons 44 only far enough for shift of the pins 22 on the latch bolts past the spring pressure center line, the spring pressure then quickly snapping the latch bolts to their unlatching position.

I thus provide simple structures for application to enclosures for operation to latch the closure cover in closed position and which are selectively operable to function as hinges along one side of the cover for opening swing of the cover from the other side thereof I have shown a practical embodiment of the features of my invention but I do not desire to be limited to the exact arrangement and operation shown and described as changes and modifications may be made without departing from the scope of the invention.

I claim as follows:

1. A combined hinge and latch structure comprising two hinge elements connected for relative swinging movement, one of said hinge elements being adapted to be rigidly secured to an enclosure body, and latching mechanism on the other hinge element comprising a latch bolt rockable into latching engagement with a closure member for the enclosure body for securing said closure member to said other hinge element for hinge movement therewith, and means on said latch bolt adapted to effect a partial opening of said closure member when said bolt is rocked to unlatching position to release said closure member, and means for controlling the rocking movement of said latch bolt.

2. A combined hinge and latch unit for two relatively swingable structures comprising two hinge elements connected for relative swinging movement, one of said hinge elements being adapted to be rigidly secured to one of said structures, and latching mechanism on the other hinge element for securing the other structure to said other hinge element for swing therewith relative to the rigidly secured hinge element, said latching mechanism comprising a latch bolt rockable to latching or unlatching position, means for initiating movement of said latch bolt to latching or unlatching position, cross center spring means for effecting the final movement of said latch bolt to latching or unlatching position, and means on said latch bolt engageable with said other swingable structure during unlatching thereof for effecting partial swinging apart of said structures.

3. A combined hinge and latch unit for automobile hoods comprising two hinge elements connected for relative swinging movement, one of said hinge elements being adapted to be rigidly secured to the hood body, and latching mechanism on the other hinge element comprising a latch bolt rockable into latching engagement with the hood cover to lock the hood cover to said other hinge element for hinge movement of the cover with said element, actuating means for initiating movement of said latch bolt to latching or unlatching position, a cross center spring means engaging said latch bolt for effecting final movement thereof to latching or unlatching position, and a setting arm on said latch bolt engageable with the hood cover during unlatching movement of the latch bolt for effecting partial opening of the cover.

EDWARD D. DALL.